(12) United States Patent
Suhr

(10) Patent No.: US 9,463,372 B2
(45) Date of Patent: *Oct. 11, 2016

(54) SYSTEMS AND METHODS FOR DISPLAYING ADVERTISING AND OTHER INFORMATION ON ATHLETIC SURFACES

(71) Applicant: Lyle Suhr, Valley Center, KS (US)

(72) Inventor: Lyle Suhr, Valley Center, KS (US)

(*) Notice: Subject to any disclaimer, the term of this patent is extended or adjusted under 35 U.S.C. 154(b) by 137 days.

This patent is subject to a terminal disclaimer.

(21) Appl. No.: 14/073,650

(22) Filed: Nov. 6, 2013

(65) Prior Publication Data

US 2015/0124475 A1 May 7, 2015

(51) Int. Cl.
| | |
|---|---|
| *G09F 13/00* | (2006.01) |
| *F21V 33/00* | (2006.01) |
| *F21V 8/00* | (2006.01) |
| *A63C 19/00* | (2006.01) |
| *F21V 23/00* | (2015.01) |
| *G02B 6/06* | (2006.01) |
| *G09F 23/00* | (2006.01) |
| *G09G 5/10* | (2006.01) |
| *G09G 5/36* | (2006.01) |
| *G09F 9/305* | (2006.01) |
| *G09F 9/33* | (2006.01) |
| *G09F 19/22* | (2006.01) |
| *F21W 131/407* | (2006.01) |
| *F21Y 105/00* | (2016.01) |
| *G09F 13/22* | (2006.01) |

(52) U.S. Cl.
CPC ............ *A63C 19/00* (2013.01); *F21V 23/003* (2013.01); *F21V 33/008* (2013.01); *G02B 6/06* (2013.01); *G09F 9/305* (2013.01); *G09F 9/33* (2013.01); *G09F 13/005* (2013.01); *G09F 19/228* (2013.01); *G09F 23/00* (2013.01); *G09F 23/0066* (2013.01); *G09G 5/10* (2013.01); *G09G 5/363* (2013.01); *F21W 2131/407* (2013.01); *F21Y 2105/003* (2013.01); *G09F 2013/222* (2013.01); *G09G 2320/0626* (2013.01); *G09G 2320/0666* (2013.01); *G09G 2320/10* (2013.01)

(58) Field of Classification Search
CPC .... G09F 13/005; G09F 13/305; G09F 13/33; G09F 23/00; G09F 23/0066; G09F 19/228; F21S 8/022; A63C 19/00; F21V 23/003; F21V 33/008; G02B 6/06; G09G 5/10; G09G 5/363

See application file for complete search history.

(56) References Cited

U.S. PATENT DOCUMENTS

| | | | |
|---|---|---|---|
| 7,245,815 B2 * | 7/2007 | Nicholls et al. | 385/147 |
| 2007/0053201 A1 * | 3/2007 | Dietz et al. | 362/559 |

* cited by examiner

*Primary Examiner* — Thomas M Sember
(74) *Attorney, Agent, or Firm* — Hovey Williams LLP

(57) ABSTRACT

A system for displaying information on a basketball court, boxing ring or other athletic surface. The system includes: a plurality of light arrays configured to be embedded in a top layer of the athletic surface and oriented to emit light upwards through the athletic surface; and a control system for selectively controlling activation of the light arrays to display advertising and other information in the athletic surface.

14 Claims, 10 Drawing Sheets

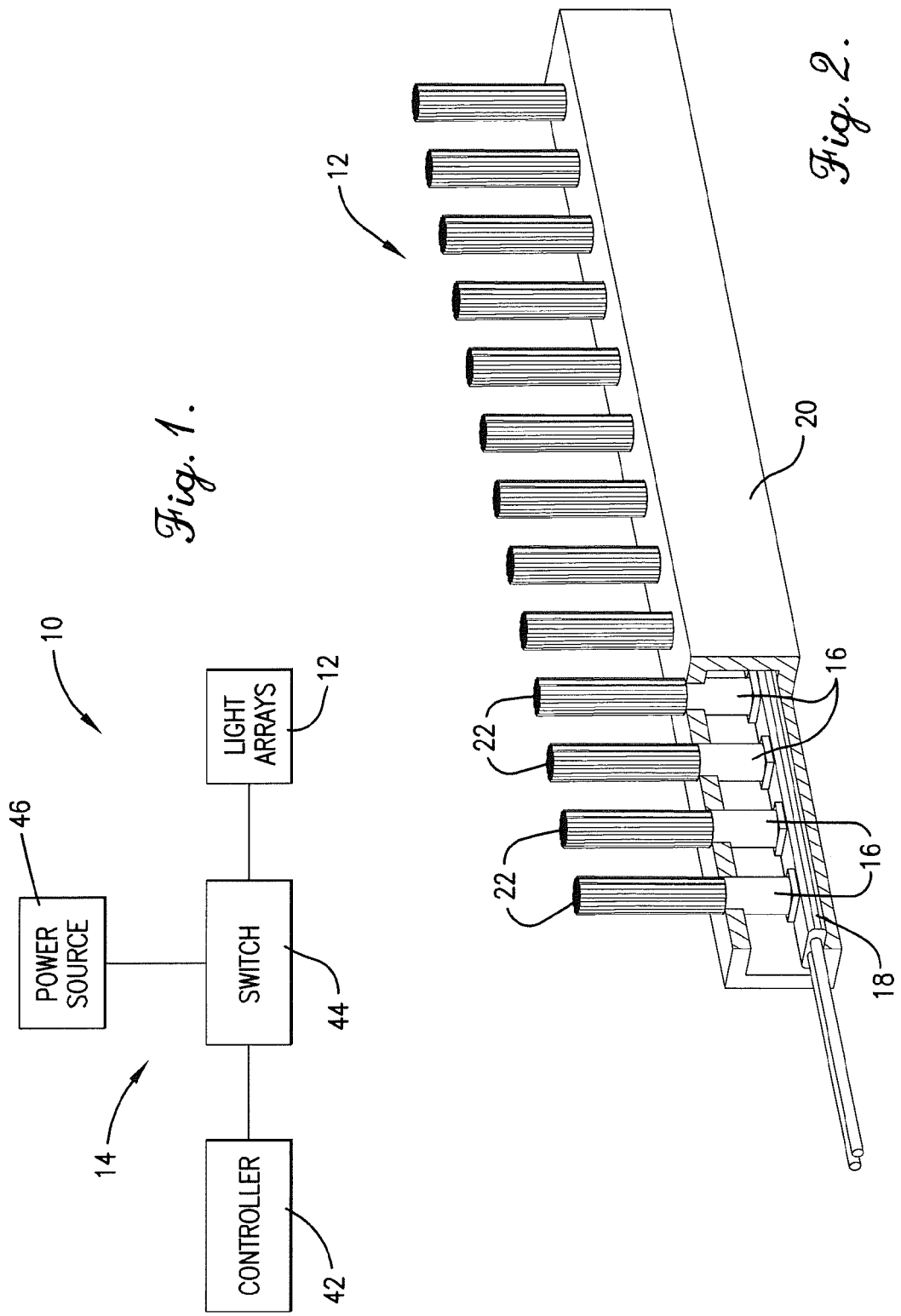

SYSTEMS AND METHODS FOR DISPLAYING ADVERTISING AND OTHER INFORMATION ON ATHLETIC SURFACES

BACKGROUND

Basketball courts, tennis courts, boxing rings, mixed martial arts (MMA) rings, and other indoor and outdoor athletic surfaces typically have scoreboards or other displays for displaying team names, scores, time periods and other information. Such scoreboards are typically hung or otherwise mounted above or alongside the athletic surfaces and can therefore partially block spectators' views of the athletic surfaces. Viewing the scoreboards also diverts the spectators' attention away from the action occurring on the athletic surfaces. Accordingly, there is a need for an improved system and method for displaying scores and other information associated with a game, match, bout, or other activity occurring on an athletic surface.

Advertising is also frequently displayed during athletic events. The advertising may be displayed on the above-described scoreboards and/or may be painted or otherwise adhered directly to the athletic surfaces. When the advertising is displayed on scoreboards, it further diverts the spectators' attention from the action occurring on the athletic surfaces. When the advertising is applied directly to the athletic surfaces, it often becomes worn and faded and is difficult and costly to replace with new advertising. Such advertising is also static and doesn't capture viewers' attention and is too costly for many companies to afford, especially for major league sports and popular college sports. Accordingly, there is a need for an improved system and method for displaying advertisements at athletic events.

SUMMARY

The present invention solves the above-described problems and provides a distinct advance in the art of systems and methods for displaying team names, scores, advertisements, and other information on basketball courts, tennis court, boxing rings, mixed martial arts (MMA) rings, and other indoor and outdoor athletic surfaces.

One embodiment of the invention is a display system that broadly comprises a plurality of light arrays and a control system for controlling the light arrays. The light arrays are configured to be at least partially embedded within a top layer of an athletic surface and oriented to emit light upwardly through the athletic surface. For example, when the athletic surface is boxing ring or MMA ring, the light arrays may be embedded within a mat, pad, or other cushion layer of the ring. A cover is then placed over the cushion and the embedded light arrays so that light from the light arrays shines through the cover. When the athletic surface is a basketball court, the light arrays may be partially embedded in a wood floor of the court so that they direct light upwardly through the wood floor.

In one embodiment, each light array comprises a plurality of linearly-aligned light-emitting diodes (LEDs) or other lights interconnected by a power conductor. The light arrays may be of any length and may be positioned at any desired intervals within the top layer of the athletic surface. Each light array may further comprise one or more light guides positioned adjacent each of the lights and extending upwardly through a portion of the athletic surface to direct light from the lights through the top layer of the athletic surface. The light guides may be fiberoptic strands, the length of which may be equal to the width of the top layer of the athletic surface.

The control system selectively controls activation of the above-described light arrays to display team names, scores, advertisements, and other information on the athletic surface. An embodiment of the control system comprises a main controller, a light controller, and a switch. The main controller, which in one embodiment is a laptop computer or other personal or server computer, is used to input texts, files, data, or other information related to information to be displayed on the athletic surface. The light controller, which may be integrated in the main controller or be a separate component, receives the data and/or instructions from the main controller and uses it to selectively control the light arrays. The light switch, which may also be integrated in the main controller and/or the light controller, is operable to selectively switch power to the light arrays. The control system may also include a video graphics processing unit (GPU).

The control system may be used to selectively activate particular light arrays or even individual lights within the arrays to display boundaries, team names, scores, time periods, and other information on the athletic surface. The control system may also display still and/or video advertising on the athletic surface. The control system may also be programmed or operated to activate some or all of the light arrays in a blinking, periodic and/or wave fashion to indicate when points are scored, a match is over, or other notable events occur. Moreover, the control system may vary the intensity, color, and duty cycle of the light arrays and individual lights to provide moving or dynamic advertising and other messages that more effectively captures viewers' attention.

The control system may also selectively activate the light arrays, and even individual lights within each array, to display training aids on the athletic surface. For example, the control system may display stationary or moving Xs and Os on the athletic surface in accordance with instructions from a coach, band director, etc. to demonstrate where players, band members, or others should position themselves and move during plays, halftime shows, etc.

The present invention offers numerous advantages over conventional methods of displaying sports related information on or near an athletic surface. For example, because the light arrays of the present invention are embedded within the athletic surface and direct light upward through the athletic surface, they do not interfere with spectators' views of the athletic surface. Moreover, information or advertising rendered by the light arrays can be easily seen by players, fans, and coaches without diverting their attention from the athletic surface.

The control system also permits advertising, messages, and other information to be quickly changed and/or replaced so that many different advertisements and/or messages may be displayed during the course of a sporting event. This allows companies to provide multiple different advertisements that may each be tailored to a time schedule and/or events happening on the athletic surface. For example, advertising for food and beverages may be displayed before half-time of a basketball game to encourage more food and beverage sales during the game and advertising for local restaurants or other establishments may be displayed near the end of the game to encourage fans to patronize the establishments after the game. The ability to quickly and easily change the advertisements also allows multiple different companies to display advertisements for short durations during a game so that each advertisement is less expensive.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 1 is a block diagram of components of a display system constructed in accordance with an embodiment of the invention.

FIG. 2 is a fragmentary perspective view of one of the light arrays of the illumination system.

Figure 3:
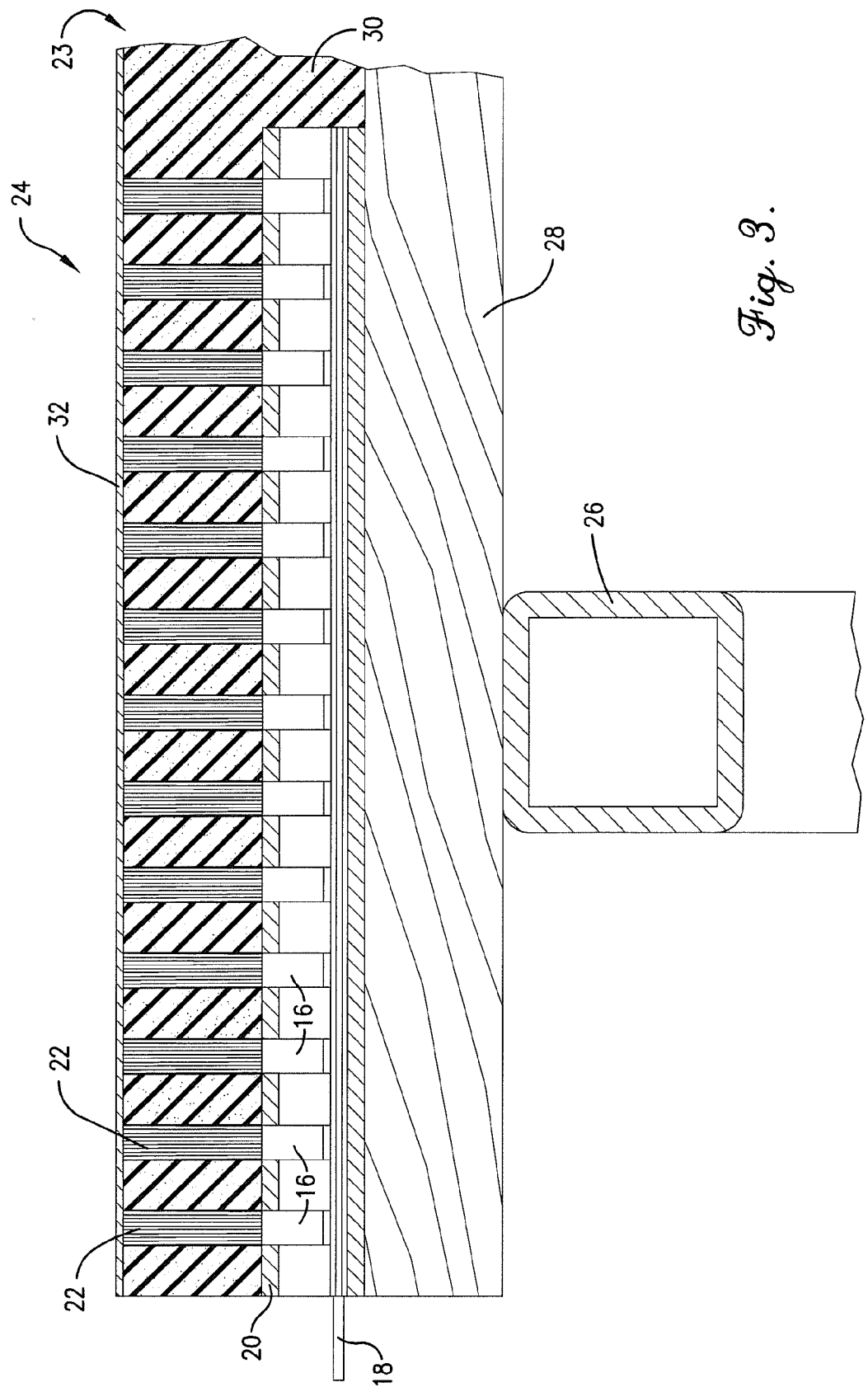
FIG. 3 is a fragmentary vertical sectional view of a floor of a boxing ring, MMA ring, or similar athletic surface with a light array embedded therein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning now to FIG. 1, the primary components of a display system 10 constructed in accordance with an embodiment of the invention are illustrated. The system 10 may be used to display boundaries, team names, scores, advertisements, messages and other information on a basketball court, tennis court, boxing ring, MMA ring, or other indoor or outdoor athletic surface. An embodiment of the display system 10 broadly comprises a plurality of light arrays 12 and a control system 14 for controlling the light arrays so as to display the above-mentioned information.

As described in more detail below, the light arrays 12 are configured to be at least partially embedded within a top layer of the athletic surface to emit light upwards through the athletic surface. For example, when the athletic surface is a boxing ring or an MMA ring, the light arrays 12 may be embedded within a mat, pad, or other cushion placed on top of the ring so that they direct light upwardly through a canvas cover or other material placed over the cushion. Similarly, when the athletic surface is a basketball court, the light arrays 12 may be partially embedded in a wood floor of the court so that they direct light upwardly through the wood floor. The control system 14 then selectively controls activation of the lights within the light arrays 12 to display boundaries, team names, scores, advertisements, and other information on the athletic surface as described in more detail below.

In more detail, the light arrays 12 may include any light sources operable to direct light upwardly through a top layer of an athletic surface. An exemplary light array 12 is shown in FIG. 2 and comprises a series of linearly-aligned and spaced-apart light-emitting diodes (LEDs) or other lights 16 connected by a flexible ribbon conductor or other power conductor 18. In one embodiment, the lights 16 are waterproof, ultra-high brightness, 6 watt, 24 volt, multi-color LEDs spaced approximately 1" apart along the length of the conductor 18. Each light array 12 may be of any length and contain any number of lights. In one embodiment, each light array 12 is approximately 1-50 feet in length and contains 10-500 lights 16.

The lights 16 and power conductor 18 may be mounted in a water-resistant protective raceway or track 20 to keep the lights aligned and to protect them from breakage. The raceway or track 20 has upper openings for directing light upwardly from the lights. In other embodiments, the lights 16 and power conductor 18 require no raceway or other protective enclosure.

Each light array 12 may further comprise one or more light guides 22 extending upwardly above each of the lights 16 so as to direct light from the lights 16. In one embodiment, the light guides 22 are fiberoptic strands approximately equal in length to a thickness of a top layer of the athletic surface in which the light arrays are embedded as explained in more detail below. In one embodiment, each fiberoptic strand is between 0.25 mm-0.75 mm in diameter and ¼"-1" in length.

Any number of the above-described light arrays 12 may be embedded in the floor of any athletic surface. For example, in embodiments illustrated in FIGS. 3-5, the light arrays 12 are embedded in the floor 23 of a boxing ring, MMA ring, or similar fighting ring 24. As best shown in FIG. 3, the floor 23 may consist of an underlying steel support frame 26; a number of plywood sheets 28 or other material mounted on top the frame 26; a pad, mat, or other cushion layer 30 positioned on top the plywood sheets 28, and a canvas cover, tarp, or other covering 32 placed over the cushion layer 30. The floor 23 illustrated in FIG. 3 is just an example of a floor in which the light arrays may be embedded and may be replaced with other floor configurations without departing from the scope of the present invention.

In one embodiment, the light arrays 12 are at least partially embedded within the pad, mat, or other cushion 30 of the floor 23 so that the fiber optic strands 22 extend upwardly from the floor and terminate just below the top cover layer 32. The top cover layer 32 may be made of transparent or translucent material to permit the light from the light arrays to pass through it and seen by fans near the ring and viewers watching an event in the ring on TV.

In one embodiment, the light arrays 12 are positioned below the entire surface area of the floor 23 in a grid fashion. For example, the light arrays may be positioned in the floor such that all the light arrays are 1" apart. The lights arrays 12 may also be spaced further apart and/or in smaller sections of the floor when it is not economically practical to place them in every inch of the floor.

Figure 6:
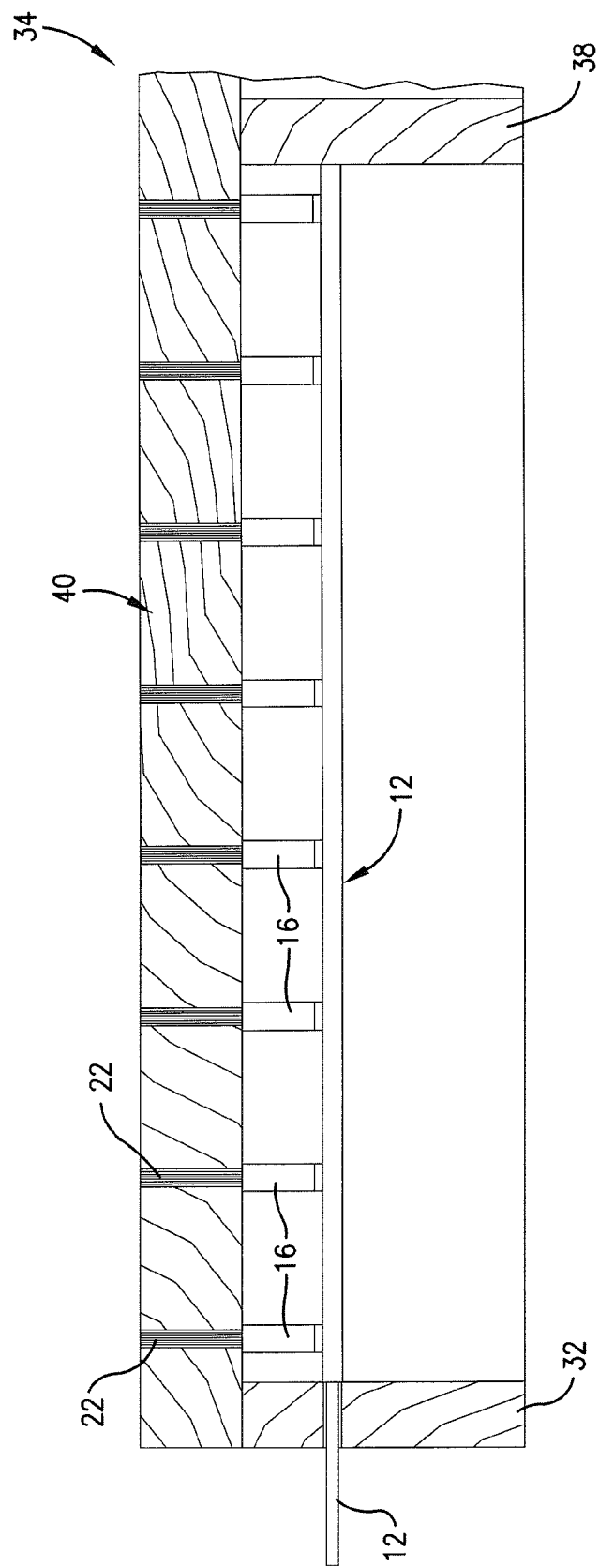
FIG. 6 is a fragmentary vertical sectional view of a floor of a basketball court or similar athletic surface with a light array embedded therein.

In another embodiment of the invention shown in FIGS. 6-11, a number of the light arrays 12 may be embedded in the floor 34 of a basketball court 36. The floor 34, which is shown in cross-section in FIG. 6, may consist of underlying wooden floor joists 38; and a number of wooden planks 40 mounted on top the floor joists. The floor 34 may also include plywood sheets or other materials between the floor joists 32 and the wooden planks 40. As with the boxing ring shown in FIG. 3, the basketball floor 34 illustrated in FIG. 6 is just an example of a floor in which the light arrays 12 may be embedded and may be replaced with other floor configurations without departing from the scope of the present invention.

Figure 7:
FIG. 7 is a top view of the basketball court in which a plurality of light arrays have been installed.

As shown in FIG. 7, holes are drilled in a grid fashion in the wood planks 40 of the basketball floor 34. The light arrays 12 are secured below the wood planks 40 so that the LEDs 16 are aligned with the holes in the planks. In embodiments in which the light arrays include one or more fiber optic strands 22 above each LED 16, the strands 22 extend upwardly though the holes and terminate just below the upper surface of the wooden planks 40. In embodiments in which the light arrays 12 do not include fiber optic strands, the LEDs 16 shine light upwardly though the holes. The tops of the holes in the wooden planks may be filled with transparent or translucent material to prevent dirt and other debris from falling in the holes while still permitting light from the LEDs to pass through the holes.

The control system 14 selectively controls activation of the light arrays 12 in the boxing ring 24 and/or basketball court 36 described above or other athletic surfaces to display boundaries, team names, scores, advertisements, and other information on the athletic surfaces. An embodiment of the control system 14 is illustrated in FIG. 1 and comprises a controller 42 and one or more light switches 44.

The controller 42 is used to input information and other data to be displayed on the athletic surface. For example, an operator may input scores, team names, etc, into the controller. This data may then be used to control the light arrays. The controller 42 may include a main controller and a separate or integrated light controller. In one embodiment, the controller is a laptop or server computer that includes a video graphics processing unit (GPU). In other embodiments, the controller 42 is a scoreboard controller used to control a scoreboard. For example, the controller may be a Daktronics All Sport 1600, 5000, or 5500 series scoreboard controller.

The controller 42 may be positioned anywhere, such as in an elevated press box or office, and may be operated by an official or other authorized person. The controller 42 may communicate with the switches over a wired or wireless data link. In an exemplary embodiment of the invention, the controller sends signal to the switches 44 over an encrypted and redundant wireless RF data channel or channels.

The controller 42 may implement an LED control software such as Led Editor 9.0 software available from XIXUN. The controller 42 and/or other components of the control system 14 may also include a rheostat or other adjustment mechanism for adjusting an intensity of the light arrays 46.

The light switches 44 are electrically connected between the controller 42, the light arrays 12, and a power source 46 and are operable to selectively switch power to the light arrays 12 under the direction of the controller 42. The light switches 44 may be integrated in the controller 42 or may be separate components that communicate with the controller 42 over a wired or wireless data link.

The power source 46 may be any electrical supply or connection that delivers electricity to the light switches 44 and light arrays 12.

The present invention may also comprise one or more computer programs stored in or on computer-readable medium residing on or accessible by the controller 42. Each computer program preferably comprises an ordered listing of executable instructions for implementing logical functions in the controller. Each computer program can be embodied in any non-transitory computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any non-transitory means that can store the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

Figure 4:
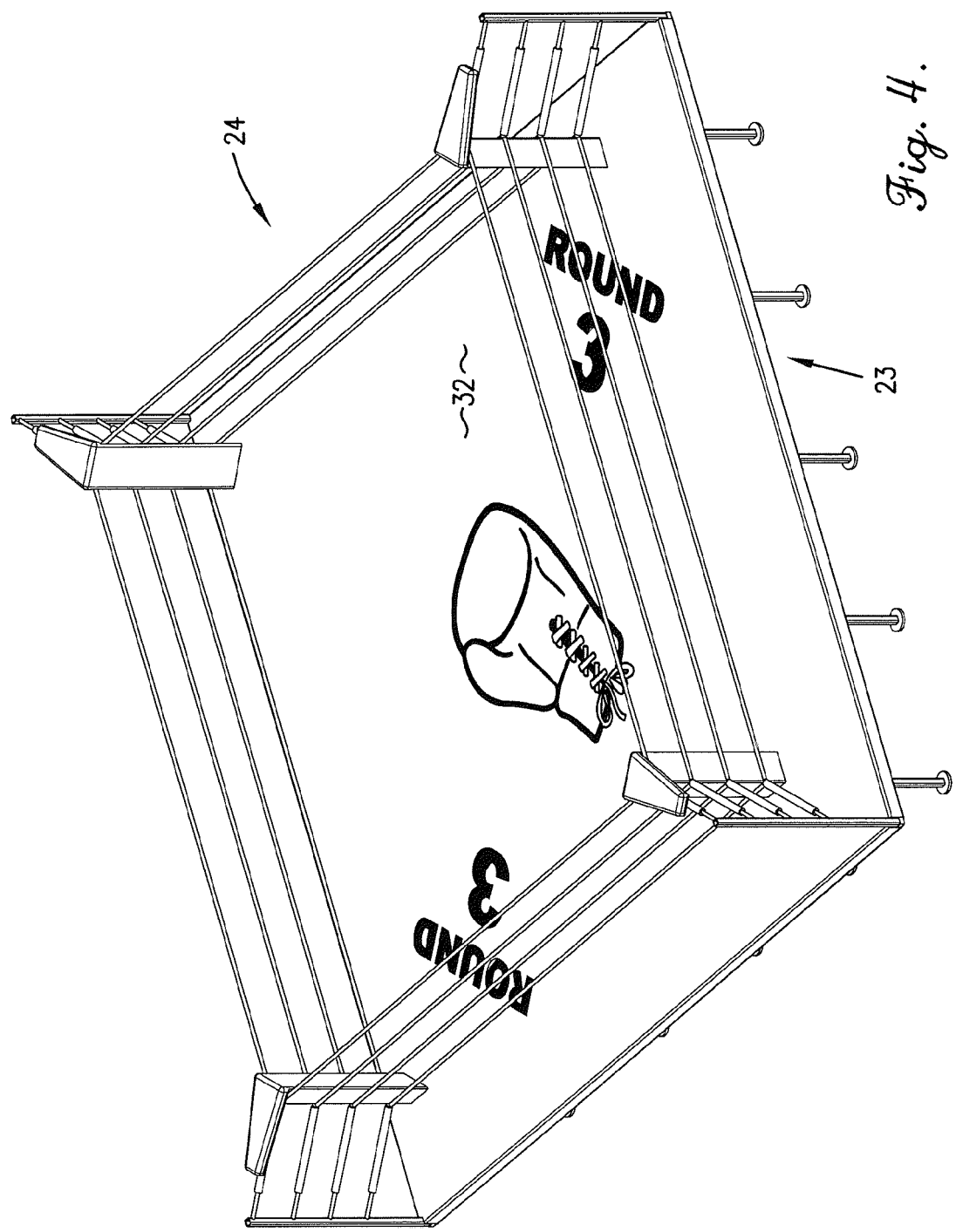
FIG. 4 is a perspective view of the boxing ring with messages and other information displayed on its floor with the display system of the present invention.
Figure 5:
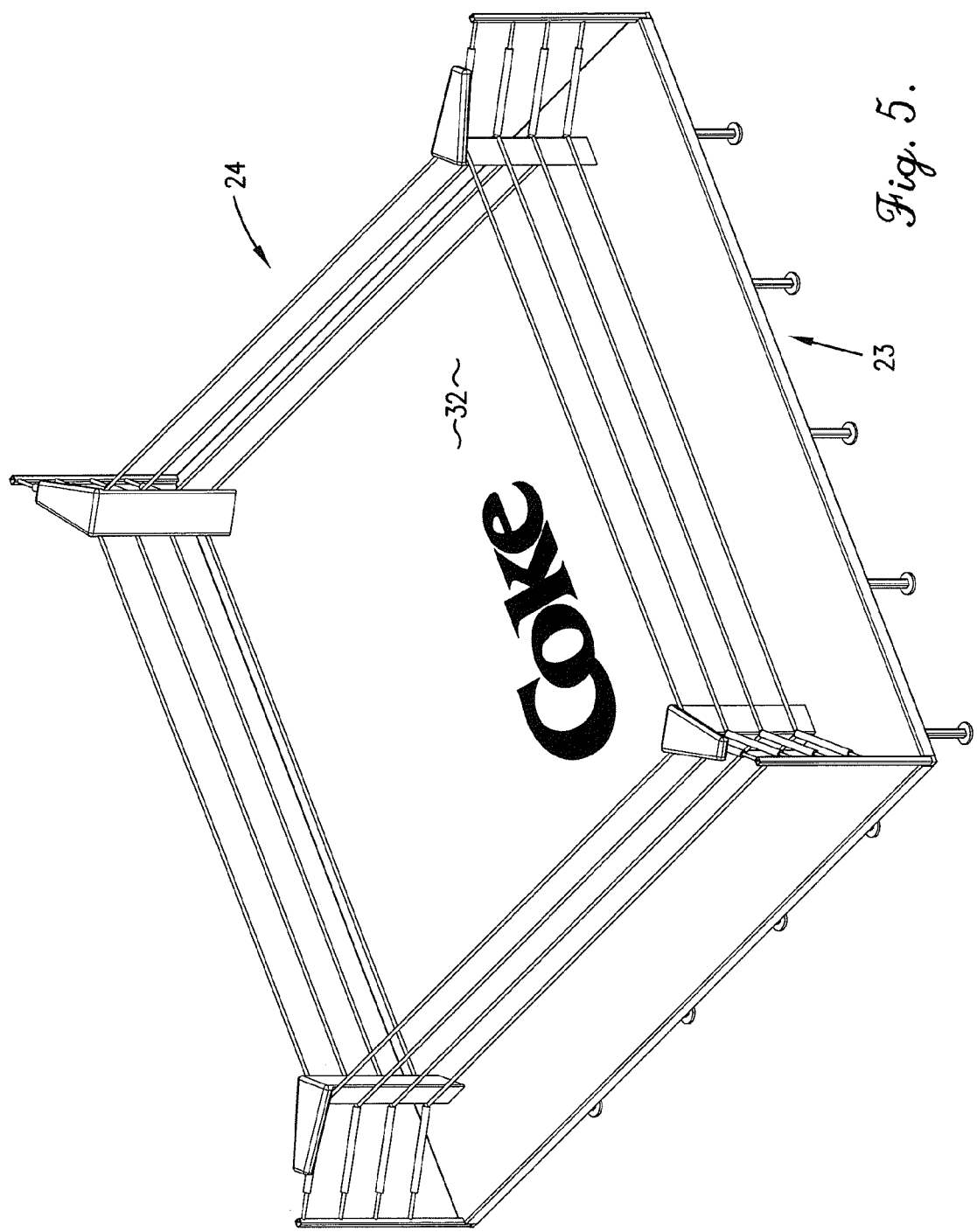
FIG. 5 is another perspective view of the boxing ring with messages and other information displayed on its floor with the display system of the present invention.
Figure 8:
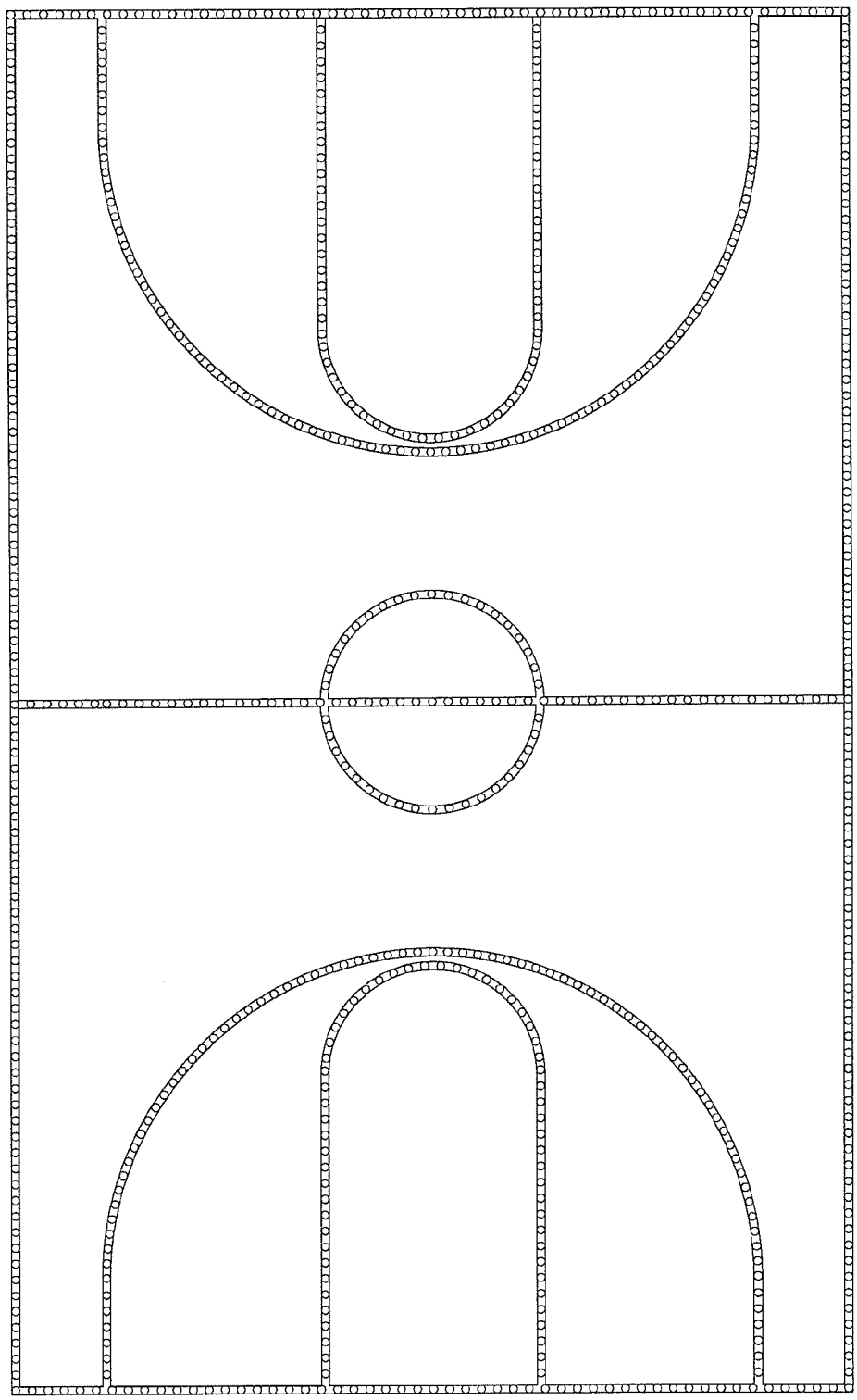
FIG. 8 is a top view of the basketball court showing boundary lines and other markings displayed on its floor with the display system of the present invention.
Figure 9:
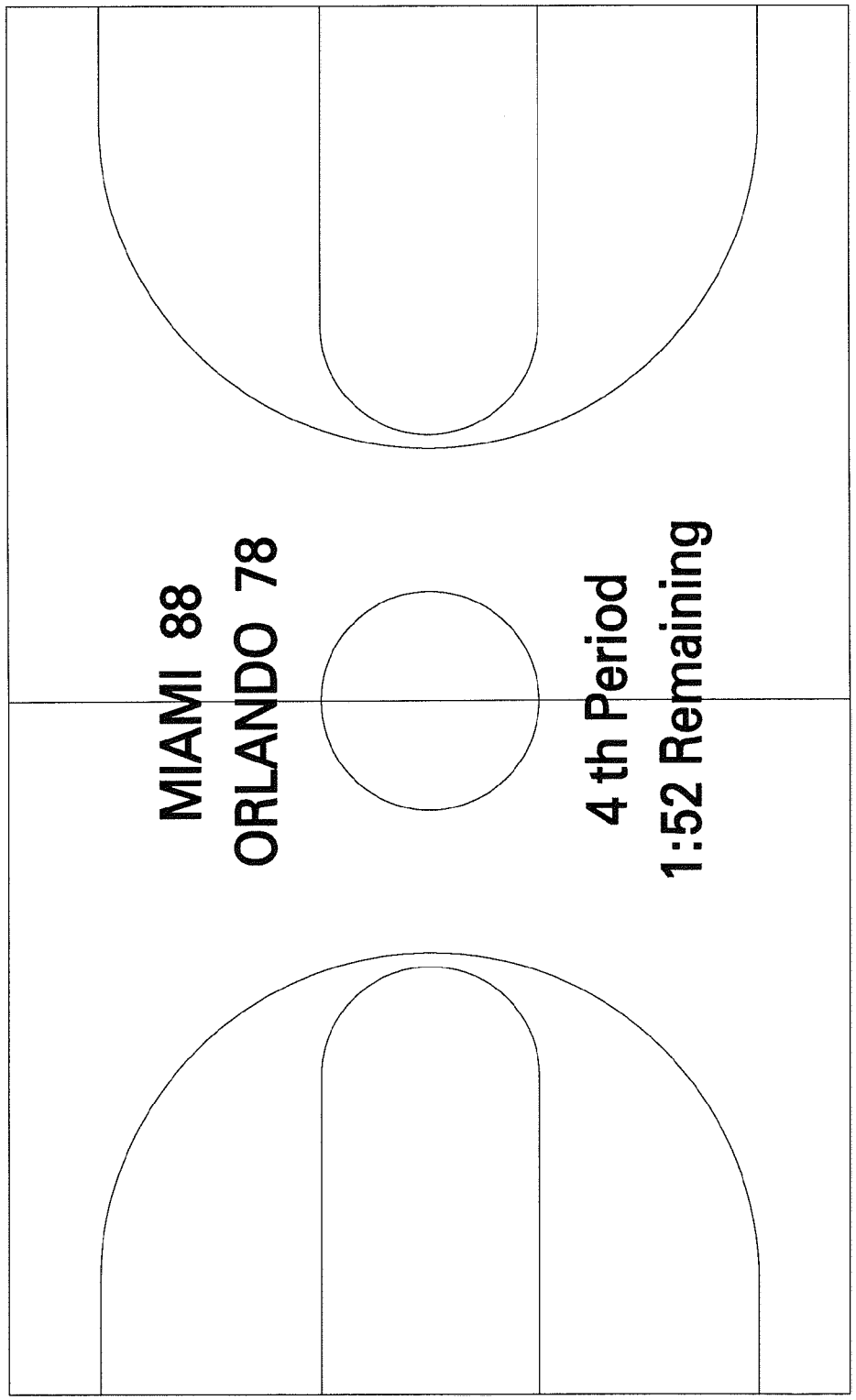
FIG. 9 is a top view of the basketball court with scores and other information displayed on its floor with the display system of the present invention.
Figure 10:
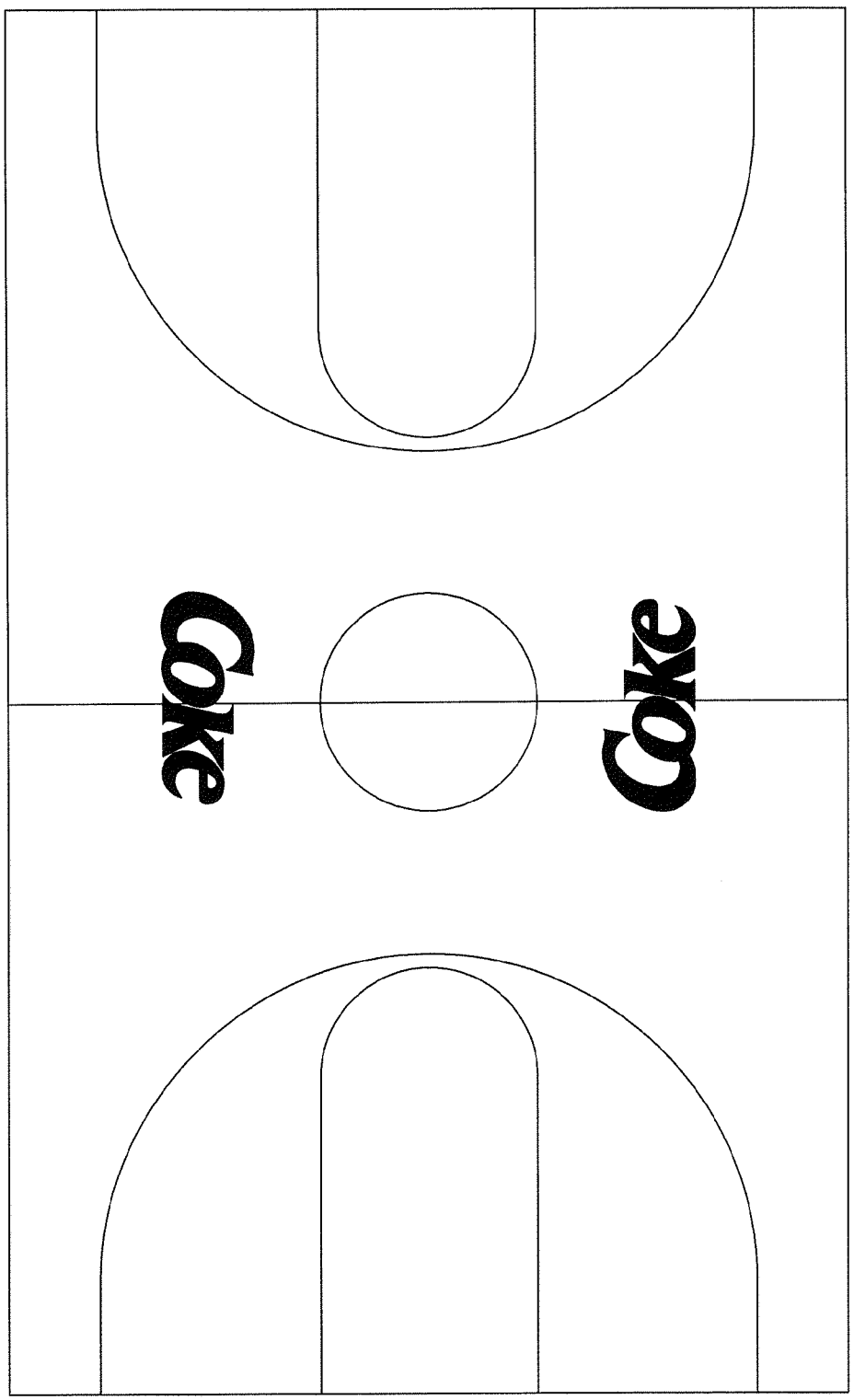
FIG. 10 is a top view of the basketball court with advertising displayed on its floor with the display system of the present invention.
Figure 11:
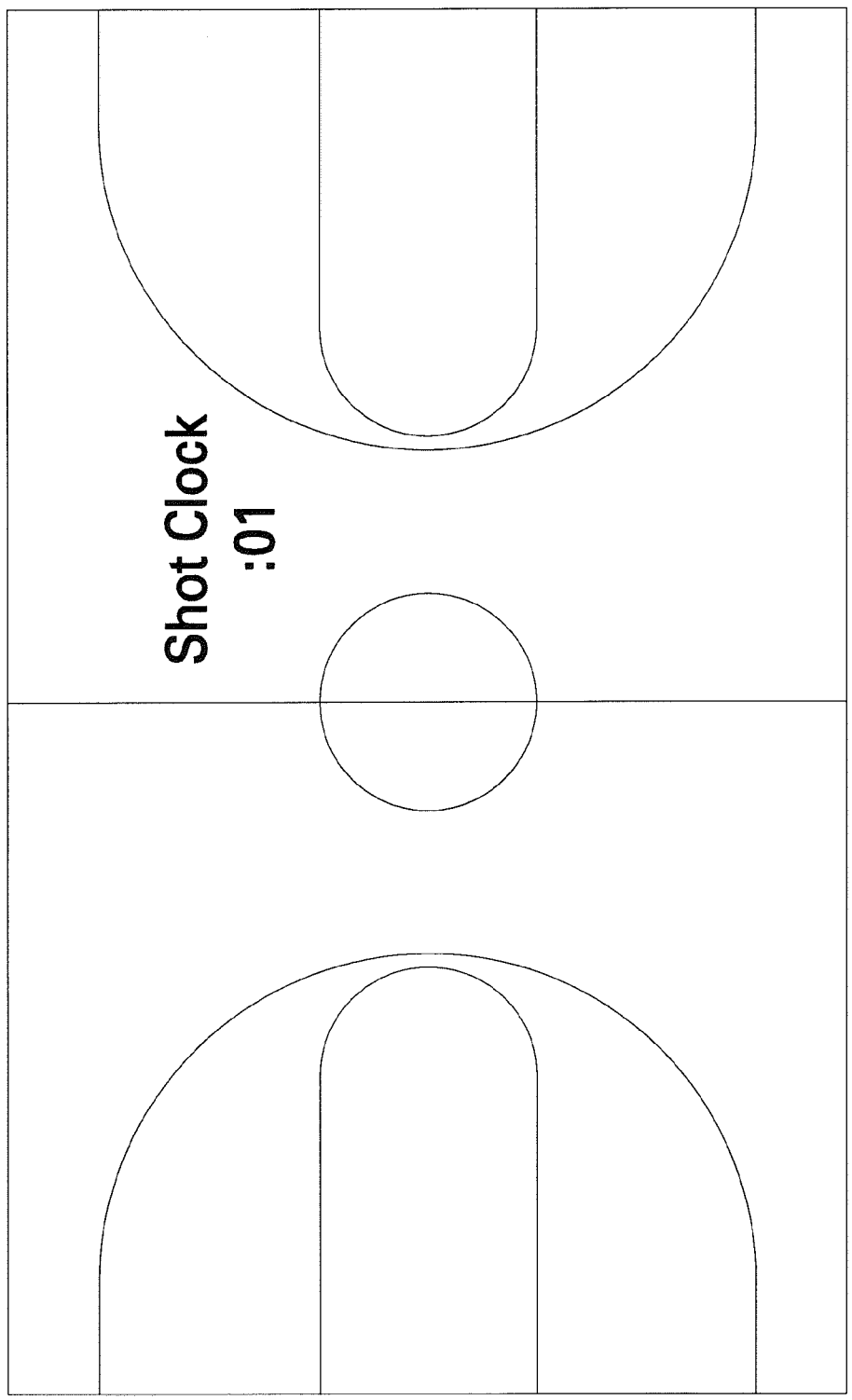
FIG. 11 is a top view of the basketball court with other information displayed on its floor with the display system of the present invention.

The above-described control system 14 may be used to selectively activate particular light arrays 12, or even individual lights within the arrays, to display boundaries, team names, scores, advertisements, and other information on any of the above described athletic surfaces. For example, the control system 14 may indicate the round of a boxing match and display boxing graphics on the boxing ring floor 23 as shown in FIG. 4. The control system 14 may also display advertisements on the boxing ring floor 23 as shown in FIG. 5. The control system 14 may also display boundaries and markers on the basketball court floor 34 as shown in FIG. 8 and/or team names, scores, and game clock information on the basketball court floor as shown in FIG. 9. The control system 14 may also display advertisements on the basketball court floor as shown in FIG. 10 and/or shot clock information on the basketball court as shown in FIG. 11.

The video GPU of the control system 14 may also receive video advertising files from any source and vary the intensity, color, and duty cycle of the light arrays 12 and individual lights 16 within the arrays to provide moving or dynamic advertising on the boxing ring floor 23 or basketball court floor 34. In some embodiments, the light arrays may be activated in the same manner that digital pixels of television screens are activated to simulate video advertisements.

Moreover, the control system 14 allows the advertising to be quickly changed and/or replaced with other advertising so that many different advertisements may be displayed during the course of a game. This allows companies to provide multiple different advertisements that may each be tailored to a time schedule and/or events happening on the athletic surface. For example, advertising for food and beverages may be displayed before half-time of a basketball game to encourage more food and beverage sales during the game and advertising for local restaurants or other establishments may be displayed near the end of the game to encourage fans to patronize the establishments after the game. This also allows multiple different companies to display advertisements for short durations during a game so that each advertisement is less expensive.

The control system 14 may also selectively activate the light arrays 12, and even individual lights within each array, to display training aids on the athletic surface. For example, the control system 14 may display stationary or moving Xs and Os on the athletic surface in accordance with instructions from a coach, band director, etc. to demonstrate where players, band members, or others should position themselves and move during plays, halftime shows, etc.

Although the invention has been described with reference to the preferred embodiment illustrated in the attached drawing figures, it is noted that equivalents may be employed and substitutions made herein without departing from the scope of the invention as recited in the claims. For example, the specific light arrays and control system described herein may be replaced with other light and control systems without departing from the scope of the invention.

Having thus described the preferred embodiment of the invention, what is claimed as new and desired to be protected by Letters Patent includes the following:

1. A system for displaying information on an athletic surface, the system comprising:
   a plurality of spaced-apart light arrays configured to be embedded within a top layer of the athletic surface, each of the light arrays comprising:
      a plurality of multi-color LED lights interconnected by a power conductor, the LED lights being spaced horizontally within the top layer of the athletic surface; and
      at least one fiber optic strand positioned adjacent each of the lights and extending upwardly from directly above the LED lights through the top layer of the athletic surface to direct light from the LED lights through the athletic surface; and
   a control system for selectively controlling activation of the light arrays to provide illuminated messages on the athletic surface.

2. The system of claim 1, wherein the illuminated messages are selected from the group consisting of advertisements, scores, team names, player statistics, and game clock information.

3. The system of claim 1, wherein the control system includes an adjustment mechanism for adjusting an intensity of the LEDs.

4. The system of claim 1, wherein the LED lights are surface mount display LED lights.

5. The system of claim 1, wherein the control system includes a video graphics processing unit operable to control activation of the light arrays to display video graphic advertising on the athletic surface.

6. The system of claim 1, wherein the athletic surface is a boxing ring, MMA ring, basketball court, or tennis court.

7. A system for displaying information on an athletic surface, the system comprising:
   a plurality of spaced-apart light arrays configured to be embedded within a top layer of the athletic surface, each of the light arrays comprising:
      a plurality of LED lights interconnected by a power conductor, the LED lights being spaced horizontally within the top layer of the athletic surface; and
      at least one fiber optic strand positioned adjacent each of the lights and extending upwardly from directly above the LED lights through the top layer of the athletic surface to direct light from the lights through the top layer of the athletic surface; and
   a control system for selectively controlling activation of the light arrays to display advertising on the athletic surface, wherein the control system includes a video graphics processing unit that activates and deactivates individual lights within the arrays to frequently change an appearance of the advertising.

8. The system of claim 7, wherein the fiber optic strands are approximately equal in length to a thickness of the top layer of the athletic surface.

9. The system of claim 7, wherein the light arrays each include a raceway attached to a subfloor below the top layer of the athletic surface.

10. The system of claim 7, wherein the control system is operable to adjust an intensity, duty cycle, and color of the lights.

11. The system of claim 7, wherein the LED lights are surface mount display LED lights.

12. The system of claim 7, wherein the video graphics processing unit is operable to control activation of the light arrays to display video graphic advertising on the football field.

13. The system of claim 7, wherein the athletic surface is a boxing ring, MMA ring, basketball court, or tennis court.

14. A system for displaying information on an athletic surface, the system comprising:
   a plurality of spaced-apart light arrays configured to be embedded within a top layer of the athletic surface, each of the light arrays comprising:
      an elongated housing including a central cavity and a plurality of top openings;
      a row of multi-color LED lights interconnected by a power conductor and positioned in the central cavity of the elongated housing, the LED lights being spaced horizontally within the top layer of the athletic surface and extending into the top openings; and
a bundle of fiber optic strands positioned adjacent each of the lights and extending upwardly from directly above the LED lights near the top openings of the elongated housing through the top layer of the athletic surface to direct light from the LED lights through the athletic surface; and
a control system for selectively controlling activation of the light arrays to provide illuminated messages on the athletic surface.

* * * * *